United States Patent [19]
Jippo et al.

[11] Patent Number: 5,107,416
[45] Date of Patent: Apr. 21, 1992

[54] ARRANGEMENT FOR SIMULTANEOUSLY DEALING WITH TRANSFER REQUESTS PRODUCED BY CENTRAL, ARITHMETIC AND INPUT-OUTPUT PROCESSORS OF A SUPER COMPUTER

[75] Inventors: Akira Jippo, Tokyo; Masafumi Okamoto; Tadashi Okano, both of Yamanashi, all of Japan

[73] Assignee: NEC Corporation, Tokyo, Japan

[21] Appl. No.: 290,623

[22] Filed: Dec. 27, 1988

[30] Foreign Application Priority Data

Dec. 24, 1987 [JP] Japan .............................. 62-325204
Dec. 24, 1987 [JP] Japan .............................. 62-325205

[51] Int. Cl.⁵ .............................................. G06F 1/00
[52] U.S. Cl. ................................................. 395/275
[58] Field of Search ... 364/200 MS File, 900 MS File

[56] References Cited
U.S. PATENT DOCUMENTS 3,510,844  7/1966  Aranyi et al. ..................... 364/200
3,510,845  9/1966  Couleur et al. .................... 364/200
3,514,758  3/1967  Bennett .............................. 364/200
3,525,080  2/1968  Couleur et al. .................... 364/200
4,100,601  7/1978  Kaufman ............................ 364/200
4,484,263  11/1984 Olson et al. ....................... 364/200

Primary Examiner—Douglas W. Olms
Assistant Examiner—T. Samuel
Attorney, Agent, or Firm—Foley & Lardner

[57] ABSTRACT

For transfer of memory contents between an extended buffer memory and one of a first and a second main memory and of a peripheral storage device connected to an input-output processor, a transfer controlling arrangement can simultaneously receive transfer requests produced by a central processor, an arithmetic processor, and the input-output processor and can control the transfer requests. The transfer controlling arrangement comprises an extended buffer memory transfer controller connected to the central and the input-output processors through a first transfer controller, to the arithmetic processor through a second transfer controller, and to the extended buffer memory.

5 Claims, 4 Drawing Sheets

ARRANGEMENT FOR SIMULTANEOUSLY DEALING WITH TRANSFER REQUESTS PRODUCED BY CENTRAL, ARITHMETIC AND INPUT-OUTPUT PROCESSORS OF A SUPER COMPUTER

BACKGROUND OF THE INVENTION

This invention relates to a transfer controlling arrangement for use in an information processing system operable as a super computer in controlling transfer requests for transfer of memory contents to and from an extended buffer memory.

In the manner known in the art, such an information processing system comprises a first and a second main memory, a peripheral device, an extended buffer memory, a central processor, an input-output processor connected to the peripheral device, an arithmetic processor, and a system controller connected to the memories and to the processors. The first main memory is for memorizing control programs and control data for the central processor. The peripheral device is for storing additional control programs and control data. The input-output processor is for producing, among others, a transfer request for transfer of a selected one of the control programs and the control data between the first main memory and the peripheral device through the system controller. The second main memory and the extended buffer memory are for storing arithmetic programs or user programs and arithmetic data for the arithmetic processor.

When issued by the central processor, a transfer request is controlled by the system controller to transfer a selected one of the control programs and the control data from the first main memory to the second main memory as a selected one of the arithmetic programs and the arithmetic data through the system controller. When issued by the central processor, another transfer request is controlled by the system controller to transfer a selected one of the arithmetic programs and the arithmetic data from the second main memory to the first main memory as a selected one of the control programs and the control data. When produced by the arithmetic processor, a transfer request is controlled by the system controller to transfer a selected one of the arithmetic programs and the arithmetic data between the second main memory and the extended buffer memory.

It has therefore been unavoidable to interrupt operation of the arithmetic processor either on transferring a selected one of the control programs and the control data from the first main memory to the extended buffer memory as a selected one of the arithmetic programs and the arithmetic data through the system controller or on transferring a selected one of the arithmetic programs and the arithmetic data from the extended buffer memory to the first main memory as a selected one of the control programs and the control data through the system controller. Interruption has also been inevitable either on transferring a selected one of the control programs and the control data from the peripheral device to the extended buffer memory as a selected one of the arithmetic programs and the arithmetic data through the input-output processor and the system controller or on transferring a selected one of the arithmetic programs and the arithmetic data from the extended buffer memory to the peripheral device as a selected one of the control programs and the control data through the system controller and the input-output processor.

Depending on the circumstances, it is possible to consider the first and the second main memories collectively as a main storage for storing arithmetic programs and data for the arithmetic processor. In this event, the peripheral stores stores additional arithmetic programs and data. The input-output processor is for producing a transfer request for transfer of a selected one of the arithmetic programs and data between the main storage and the peripheral device through the system controller. The control programs and data may alternatively be called control contents. The arithmetic programs and data may be called arithmetic contents.

The central, the input-output, and the arithmetic processors are independently operable although the input-output and the arithmetic processors are controlled by the central processor through the system controller in the manner which will be exemplified later in the following description. This gives a high speed throughput to the information processing system. Interruption of operation of the arithmetic processor, however, degrades the throughput.

SUMMARY OF THE INVENTION

It is therefore an object of the present invention to provide a transfer controlling arrangement for use in a system controller of an information processing system in dealing with transfer requests which may simultaneously be produced by a central, an input-output, and an arithmetic processor of the information processing system.

It is another object of this invention to provide a transfer controlling arrangement of the type described, for which the information processing system comprises a first and a second main memory, a peripheral device connected to the input-output processor, and an extended buffer memory, for which the arithmetic processor produces a first transfer request for transfer of memory contents between the second main memory and the extended buffer memory, and which can simultaneously deal with the first transfer request, a second transfer request produced by the central processor for transfer of a memory content between the first main memory and the extended buffer memory, and a third transfer request produced by the input-output processor for transfer of memory contents between the peripheral device and the extended buffer memory through the input-output processor.

It is still another object of this invention to provide a transfer controlling arrangement of the type described, which can deal with transfer of memory contents between the first main memory and the extended buffer memory and between the peripheral device and the extended buffer memory through the input-output processor without interruption of operation of the arithmetic processor.

Other objects of this invention will become clear as the description proceeds.

According to an aspect of this invention, a transfer controlling arrangement is for use in an information processing system which comprises a main storage for storing user programs and data, a peripheral device for storing user programs and data, a an extended buffer memory for storing user programs and data, a an input-output processor for producing a transfer request for transfer of a selected one of the user programs and data between the main storage and the peripheral device, and an arithmetic processor for executing the user programs stored in the main storage and in the extended buffer memory.

According to the aspect being described, the transfer controlling arrangement is connected to the main storage, the extended buffer memory, the input-output processor, and the arithmetic processor for simultaneously receiving a first transfer request produced by the input-output processor for transfer of a selected one of the user programs and data between the peripheral device and the extended buffer memory through the input-output processor and a second transfer request produced by the arithmetic processor for transfer of a selected one of the user programs and data between the main storage and the extended buffer memory and for controlling the first and the second transfer requests.

According to another aspect of this invention, a transfer controlling arrangement is for use in an information processing system which comprises a first main memory for storing control programs and control data, a second main memory for storing arithmetic programs and arithmetic data, an extended buffer memory for storing arithmetic programs and arithmetic data, a central processor for executing the control programs, and an arithmetic processor for executing the arithmetic programs stored in the second main memory and in the extended buffer memory.

According to the later-mentioned aspect of this invention, the transfer controlling arrangement is connected to the first and the second main memories, the extended buffer memory, and the central and the arithmetic processors for simultaneously receiving a first transfer request produced by the central processor for transfer of a selected one of the control programs and the control data from the first main memory to the extended buffer memory as a selected one of the arithmetic programs and the arithmetic data, a second transfer request produced by the central processor for transfer of a selected one of the arithmetic programs and the arithmetic data from the extended buffer memory to the first main memory as a selected one of the control programs and the control data, and a third transfer request produced by the arithmetic processor for transfer of a selected one of the arithmetic programs and the arithmetic data between the second main memory and the extended buffer memory and for controlling the first through the third transfer requests.

According to still another aspect of this invention, a transfer controlling arrangement is for use in an information processing system which comprises a first main memory for storing control contents, a peripheral device for storing control contents, a second main memory for storing arithmetic contents, an extended buffer memory for storing arithmetic contents, a central processor for processing the control contents stored in the first main memory, an input-output processor for producing a transfer request for transfer of a selected one of the control contents between the first main memory and the peripheral device, and an arithmetic processor for processing the arithmetic contents stored in the second main memory and in the extended buffer memory.

According to the last-mentioned aspect of this invention, the transfer controlling arrangement is connected to the first and the second main memories, to the peripheral device through the input-output processor, to the extended buffer memory, and to the central, the input-output, and the arithmetic processors for simultaneously receiving a first transfer request produced by the central processor for transfer of a selected one of the control contents of the first main memory to the extended buffer memory as a selected one of the arithmetic contents, a second transfer request produced by the central processor for transfer of a selected one of the arithmetic contents of the extended buffer memory to the first main memory as a selected one of the control contents, a third transfer request produced by the input-output processor for transfer of a selected one of the control contents of the peripheral device to the extended buffer memory as a selected one of the arithmetic contents, a fourth transfer request produced by the input-output processor for transfer of a selected one of the arithmetic contents of the extended buffer memory to the peripheral device as a selected one of the control contents, a fifth transfer request produced by the arithmetic processor for transfer of a selected one of the arithmetic contents from the second main memory to the extended buffer memory, and a sixth transfer request produced by the arithmetic processor for transfer of a selected one of the arithmetic contents from the extended buffer memory memory to the second main memory and for controlling the first through the sixth transfer requests.

DESCRIPTION OF THE PREFERRED EMBODIMENT

Figure 1:
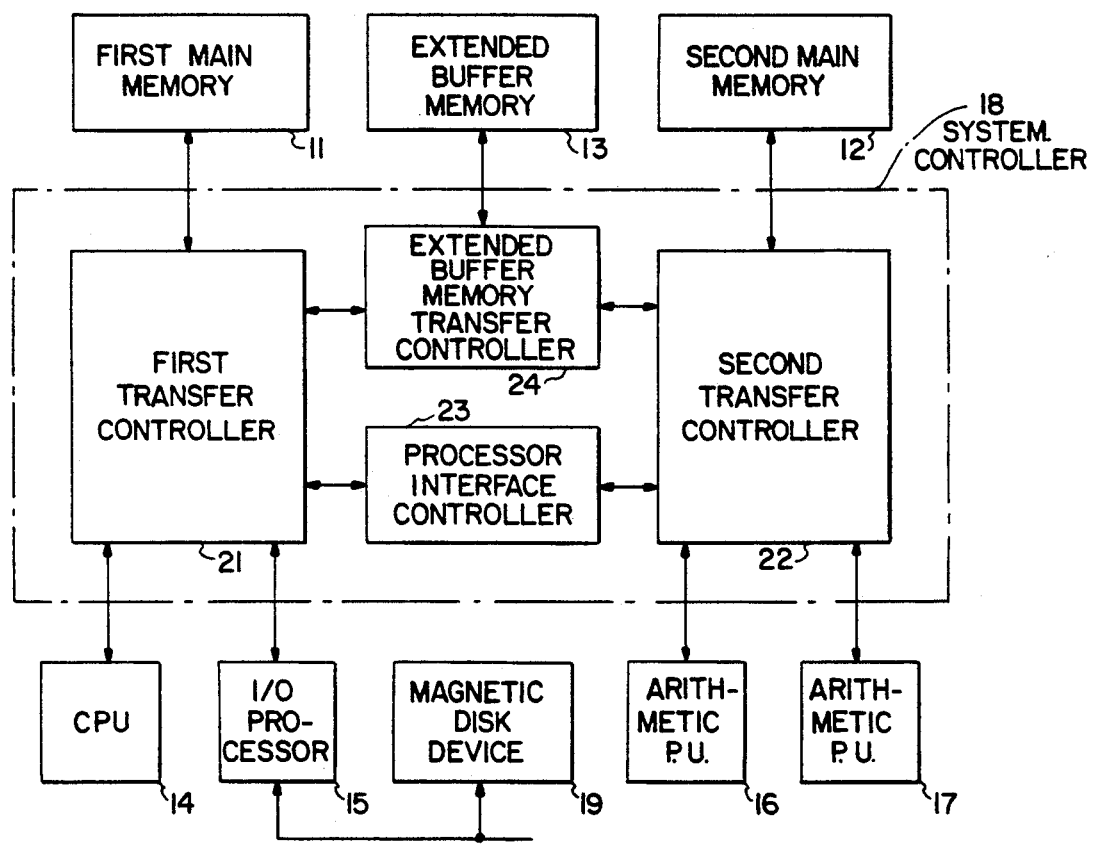
FIG. 1 is a block diagram of an information processing system which includes a transfer controlling arrangement according to an embodiment of the instant invention.

Referring to FIG. 1, the present invention is applicable to an information processing system which is operable as a super computer and comprises first and second main memories 11 and 12, an extended buffer memory 13, a central processor or processing unit (CPU) 14, an input-output (I/O) processor 15, and first and second arithmetic processing units 16 and 17, The first and the second main memories 11 and 12 will collectively be called a main or primary storage. The first and the second arithmetic processing units 16 and 17 and at least one like arithmetic processing unit (not shown) will be referred to either individually or collectively as an arithmetic processor, which will be designated by the reference numeral 16.

In the information processing system, a system controller 18 is connected to the memories 11 through 13 and the processors 14 through 16. A magnetic disk memory 19 and one or more like external memory devices (not shown) are connected to the input-output processor 15. Such external memory devices are used collectively as a peripheral device, which will be denoted by the reference numeral 19 and serves as secondary storage in relation to the main storage. The peripheral device 19 may include at least one input device and one or more output devices (not shown).

The first main memory 11 is for storing control programs and control data for the central processor 14 as its memory contents. The second main memory 12 is for storing arithmetic programs and arithmetic data for the arithmetic processor 16 as its memory contents. The arithmetic programs are what are usually called user programs. It is therefore possible to consider the main storage as being for storing programs and data as its memory contents.

Each of the main memories 11 and 12 has a large memory capacity. The information processing system must, however, deal with a great amount of programs and data which is beyond the memory capacity of the first main memory 11. The peripheral device 19 is therefore used in storing additional control programs and control data.

The processors 14 through 16 are independently operable although the input-output and the arithmetic processors 15 and 16 are controlled by the central processor 14 through the system controller 18 in the manner which will be exemplified later in the following description. This gives a high throughput to the information processing system.

More particularly, the central processor 14 executes the control programs of the first main memory 11 by reading memory contents from the first main memory 11 and storing results of execution of the control programs in the main memory 11 through the system controller 18. Depending on the circumstances, the central processor 14 issues a transfer request for transfer of a selected one of the memory contents between the first and the second main memories 11 and 12 through the system controller 18. Controlled by the central processor 14, the input-output processor 15 produces a transfer request for transfer of a selected one of the memory contents between the first main memory 11 and the peripheral device 19 therethrough and through the system controller 18.

The arithmetic processor 16 executes the arithmetic programs of the second main memory 12 by reading memory contents from the second main memory 12 and storing results of execution of the arithmetic programs in the second main memory 12 through the system controller 18. In order to achieve high-speed operation of the arithmetic processor 16, the extended buffer memory 13 is used in temporarily storing parts of arithmetic programs and arithmetic data for use by the arithmetic processor 16 through the system controller 18.

The memory contents of the first main memory 11 are used mostly as operating systems which run on the central processor 14. The arithmetic programs are primarily for vector calculations and secondarily for scalar calculations. For high-speed processing of the vector calculations, the arithmetic processor 16 is operable under multiple parallel pipeline control. By way of example, the arithmetic processor 16 is connected to the second main memory 12 and to the extended buffer memory 13 through eight eight-byte reading busses and eight eight-byte storing busses to carry out 64-byte memory content transfer per machine cycle.

In a conventional information processing system, the arithmetic processor 16 must always be used on transferring a selected one of the arithmetic programs and the arithmetic data between the second main memory 12 and the extended buffer memory 13 through the system controller 18. It has therefore been inevitable on transferring the memory contents, for example, from the peripheral device 19 to the extended buffer memory 13 that the central processor 14 is first used to make the input-output processor 15 transfer the memory contents from the peripheral device 19 to the first main memory 11 and to transfer the memory contents from the first main memory 11 to the second main memory 12. Subsequently, the arithmetic processor 16 is used in transferring the memory contents from the second main memory 12 to the extended buffer memory 13.

In this manner, the arithmetic processor 16 must be used in transferring a selected one of the memory contents between the peripheral device 19 and the extended buffer memory 13. Execution of the arithmetic programs must therefore be interrupted in the meantime. This undesiredly degrades the throughput of the information processing system.

According to a preferred embodiment of this invention, the system controller 18 comprises a first transfer controller 21 between the first main memory 11 and a combination of the central processor 14 and the input-output processor 15 and a second transfer controller 22 between the second main memory 12 and the arithmetic processor 16. A processor interface controller 23 is interposed between the first and the second transfer controllers 21 and 22. An extended buffer memory transfer controller 24 is connected to the first and the second transfer controllers 21 and 22 and to the extended buffer memory 13.

The first transfer controller 21 is used in controlling transfer of the memory contents between the first main memory 11 and the central processor 14 and between the first main memory 11 and the peripheral device 19 through the input-output processor 15. The second transfer controller 22 controls transfer of the memory contents between the second main memory 12 and the arithmetic processor 16.

The processor interface controller 23 controls communication between the central and the input-output processors 14 and 15 and the arithmetic processor 16 through the first and the second transfer controllers 21 and 22. This enables transfer of the memory contents between the first and the second main memories 11 and 12. The first transfer controller 21 is enabled to transfer the memory contents between whichever of the central and the input-output processors 14 and 15 and the second main memory 12. The second transfer controller 22 is enabled to transfer the memory contents between the arithmetic processor 16 and the first main memory 11.

In the manner which will later be described in detail, the extended buffer memory transfer controller 24 is used in controlling a transfer request which is issued from the central processor 14 to transfer the memory contents between the first main memory 11 and the extended buffer memory 13 through the first transfer controller 21 and is received through the first transfer controller 21. The extended buffer memory transfer controller 24 furthermore controls a transfer request which is produced by the input-output processor 15 for transfer of the memory contents between the peripheral device 19 and the extended buffer memory 13 through the input-output processor 15 and the first transfer controller 21 and is received through the first transfer controller 21. In addition, the extended buffer memory transfer controller 24 is operable like the system controller 18 of the conventional information processing system to control a transfer request which is issued from the arithmetic processor 16 for transfer of the memory contents between the second main memory 12 and the extended buffer memory 13 through the second transfer controller 22 and is received through the second transfer controller 22.

A little more in detail, it will be assumed that a transfer request is produced by the input-output processor 15 to transfer a selected one of the memory contents between the peripheral device 19 and the extended buffer memory 13 directly without interruption of operation of the arithmetic processor 16. In this instance, the transfer request activates the extended buffer memory transfer controller 24 through the first transfer controller 21. Having been activated, the extended buffer memory transfer controller 24 controls transfer which is carried out for the selected memory content between the peripheral device 19 and the extended buffer memory 13 through the input-output processor 15 and the first transfer controller 21. Having controlled the transfer, the extended buffer memory transfer controller 24 reports completion of the transfer to the input-output processor 15 through the first transfer controller 21.

When issued from the central processor 14 for transfer of a selected one of the memory contents between the first main memory 11 and the extended buffer memory 13 directly without interruption of operation of the arithmetic processor 16, a transfer request activates the extended buffer memory transfer controller 24 through the first transfer controller 21. In response, the extended buffer memory transfer controller 24 controls transfer of the selected memory content between the first main memory 11 and the extended buffer memory 13 through the first transfer controller 21. After transfer of the selected memory content, the extended buffer transfer controller 24 reports completion of the transfer to the central processor 14 through the first transfer controller 21.

When produced by the arithmetic processor 16 for transfer of a selected one of the memory contents between the second main memory 12 and the extended buffer memory 13, a transfer request activates the extended buffer memory transfer controller 24 through the second transfer controller 22. The extended buffer memory transfer controller 24 controls transfer of the selected memory content between the second main memory 12 and the extended buffer memory 13 through the second transfer controller 22. After the transfer, the extended buffer memory transfer controller 24 reports completion of the transfer to the arithmetic processor 16 through the second transfer controller 22.

Collision may take place at the extended buffer memory transfer controller 24 among the transfer requests received from the central processor 14, the input-output processor 15, and the arithmetic processor 16. In such an event, the extended buffer memory transfer controller 24 controls the transfer requests. In this manner, the extended buffer memory transfer controller 24 can simultaneously receive the transfer requests produced by the processors 14 through 16 and controls transfer of the selected memory contents between the first main memory 11 and the extended buffer memory 13, between the peripheral device 19 and the extended buffer memory 13 through the input-output processor 15, and between the second main memory 12 and the extended buffer memory 13. This makes it possible to keep the arithmetic processor 16 in operation without interruption on transferring the selected memory contents between the extended buffer memory 13 and the first main memory 11 and between the extended buffer memory 13 and the peripheral device 19 through the input-output processor 15 and to raise the throughput of the information processing system.

The following should now be understood. A combination of the first and the second transfer controllers 21 and 22 and the extended buffer memory transfer controller 24 serves as a transfer controlling arrangement for simultaneously receiving a first transfer request produced by the central processor 14 for transfer of a selected one of the control contents of the first main memory 11 to the extended buffer memory 13 as a selected one of the arithmetic contents, a second transfer request produced by the control processor 14 for transfer of a selected one of the arithmetic contents of the extended buffer memory 13 to the first main memory 11 as a selected one of the control contents, a third transfer request produced by the input-output processor 15 for transfer of a selected one of the control contents of the peripheral device 19 to the extended buffer memory 13 as a selected one of the arithmetic contents, a fourth transfer request produced by the input-output processor 15 for transfer of a selected one of the arithmetic contents of the extended buffer memory 13 to the peripheral device 19 as a selected one of the control contents, a fifth transfer request produced by the arithmetic processor 16 for transfer of a selected one of the arithmetic contents from the second main memory 11 to the extended buffer memory 13, and a sixth transfer request produced by the arithmetic processor 16 for transfer of a selected one of the arithmetic contents from the extended buffer memory 13 to the second main memory 12 and for controlling the first through the sixth transfer requests.

Figure 2:
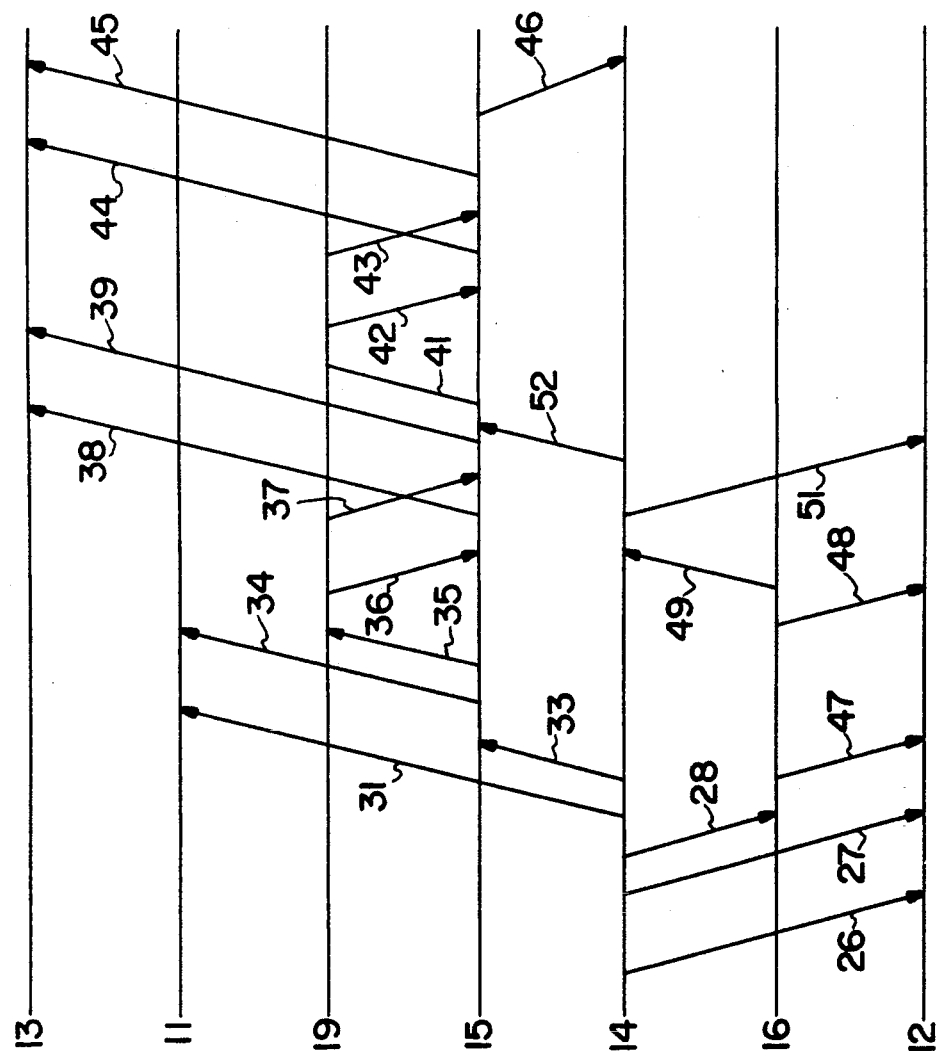
FIG. 2 is a schematic time chart for use in describing operation of the information processing system illustrated in FIG. 1.

Referring to FIG. 2, first through seventh horizontal lines show, from the top to the bottom of the figure, time axes of operation of the extended buffer memory 13, the first main memory 11, the peripheral device 19, the input-output processor 15, the central processor 14, the arithmetic processor 16, and the second main memory 12 in the manner labeled with the reference numerals leftwardly of the seven horizontal lines. Operation of the arithmetic processor 16 is exemplified by diagonal lines drawn as time chart lines among the three horizontal lines depicted lower in the figure. That is, objects of an arithmetic program are successively written by the central processor 14 in the second main memory 12 as indicated between diagonal lines 26 and 27. The central processor 14 activates the arithmetic processor 16 as indicated by a diagonal line 28.

It is presumed in FIG. 2 that the central processor 14 executes, following activation of the arithmetic processor 16 as shown by the diagonal line 28, a process of N consecutive transfer instructions indicative of transfer of selected ones of the memory contents from a source to a destination which are selected from the first and the second main memories 11 and 12, the extended buffer memory 13, and the external memory devices of the peripheral device 19. A synchronously executing the transfer instructions, the central processor 14 stores a channel program in the first main memory 11 for each transfer instruction in the manner indicated by a diagonal line 31.

Figure 3:
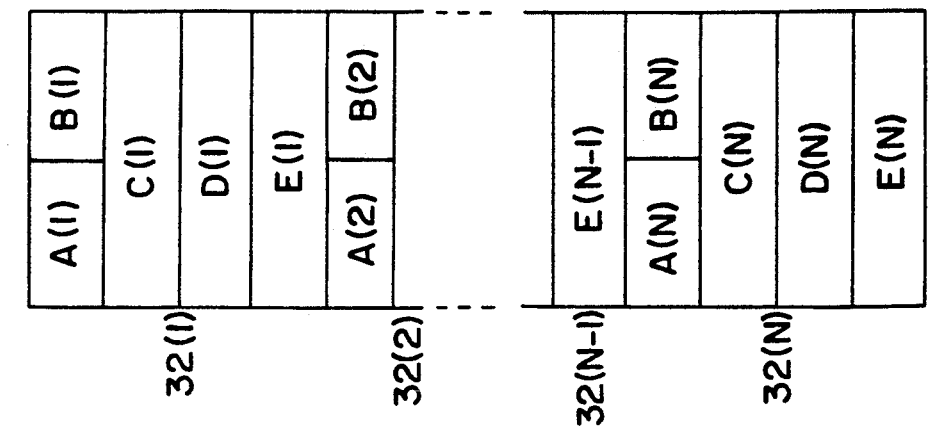
FIG. 3 shows a format of channel programs which are stored in a first main memory of the information processing system depicted in FIG. 1.

Turning to FIG. 3 for a short while, first through N-th channel programs 32(1) to 32(N) are formed in one-to-one correspondence to the N transfer instructions. Each of the channel programs 32 (suffixes omitted) comprises first through fifth fields A, B, C, D, and E. The fields of the respective channel programs 32 are designated by A(1) to E(1) through A(N) to E(N). In each of the channel programs 32, the first field A indicates whether a read command or a write command is included in the transfer instruction which corresponds to the channel program under consideration. The second field B of each channel program indicates a pair of codes for a destination and a source of transfer of a selected one of memory contents. The third field C represents a top or leading address at which storage of the selected memory contents in question should start in the destination.

In FIG. 3, the fourth field D of the channel program in question represents a top address at which read of the selected memory contents under consideration should start in the source. The fifth field E represents a memory contents length of the selected memory contents being dealt with. The selected memory contents are therefore specified in each channel program by the top address of the source and the memory contents length, namely, by the fourth and the fifth fields D and E.

For the example depicted in FIG. 2, a write command is indicated by the first field A of each of the channel programs 32. The extended buffer memory 13 is indicated as the destination in the second field B. One of the external memory devices of the peripheral device 19 is specified as a particular device in each second field B.

Turning back to FIG. 2, the central processor 14 activates the input-output processor 15 in the manner indicated by a diagonal line 33. Thereafter, the central processor 14 can execute a different process without synchronously waiting completion of transfer of the selected memory contents. It is therefore possible to raise the throughput of the information processing system.

Having been activated, the input-output processor 15 reads the channel programs 32 from the first main memory 11 as indicated by a diagonal line 34 and deals with the first channel program 32(1) at first. In compliance with the read command in the first field A(1) and in the manner indicated by a diagonal line 35, the input-output processor 15 activates the particular device which is specified by the second field B(1) as the source. The particular device now delivers the selected memory content to the input-output processor 15, starting at the top address represented by the fourth field D(1) until the selected memory content is wholly produced from the particular device up to an end or trailing address which is known from the memory contents length represented by the fifth field E(1). In this manner, the selected memory contents are read from the particular device as indicated between diagonal lines 36 and 37.

It will presently be described in detail that the selected memory contents is temporarily stored, being read from the particular device between the diagonal lines 36 and 37, in the extended buffer memory transfer controller described in conjunction with FIG. 1. The extended buffer memory transfer controller 24, in turn, stores the selected memory contents in the extended buffer memory 13, starting at the top address represented by the third field C(1). For the first channel program 32(1), storage of the selected memory contents in the extended buffer memory 13 is indicated between diagonal lines 38 and 39.

The above-mentioned diagonal line 37 furthermore indicates an asynchronous report to the input-output processor 15 as regards completion of read of the selected memory contents from the particular device. In response to the asynchronous report, the input-output processor 15 activates the particular device specified by the second field B of the next following channel program. It will be assumed merely for brevity of the description that the next following channel program is the N-th channel program 32(N). A diagonal line 41 indicates activation of the particular device specified by the second field B(N).

Diagonal lines 42 and 43 show start and end of read, from the peripheral device under consideration, of the selected memory content which is indicated by the fourth and the fifth fields D(N) and E(N). The diagonal line 43 furthermore indicates an asynchronous report of completion of the read like the diagonal line 37. Diagonal lines 44 and 45 show start and end of storage of the selected memory content in the extended buffer memory 13. Insofar as the input-output processor 15 is concerned, transfer of the selected memory contents comes to an end. The input-output processor 15 sends an asynchronous report of completion of transfer of the selected memory contents to the central processor 14 in the manner indicated by a diagonal line 46.

During a time interval in which the selected memory contents are transferred from the peripheral device 19 to the extended buffer memory 13, the arithmetic processor 16 continues execution of the arithmetic program. That is, the objects are executed by the arithmetic processor 16 activated at the diagonal line 28. The arithmetic processor 16 stores job results of execution of the arithmetic program in the second main memory 12 through the second transfer controller 22 in the manner indicated between diagonal lines 47 and 48. Having executed the arithmetic program, the arithmetic processor 16 sends an end report to the central processor 14 as indicated by a diagonal line 49.

If the job results should be delivered to one of the output devices of the peripheral device 19, the central processor 14 activates the second main memory 12 as indicated by a diagonal line 51. In the manner indicated by a diagonal line 52, the central processor 14 activates the input-output processor 15 to have the job results delivered to the output device by which the job results should be produced.

Figure 4:
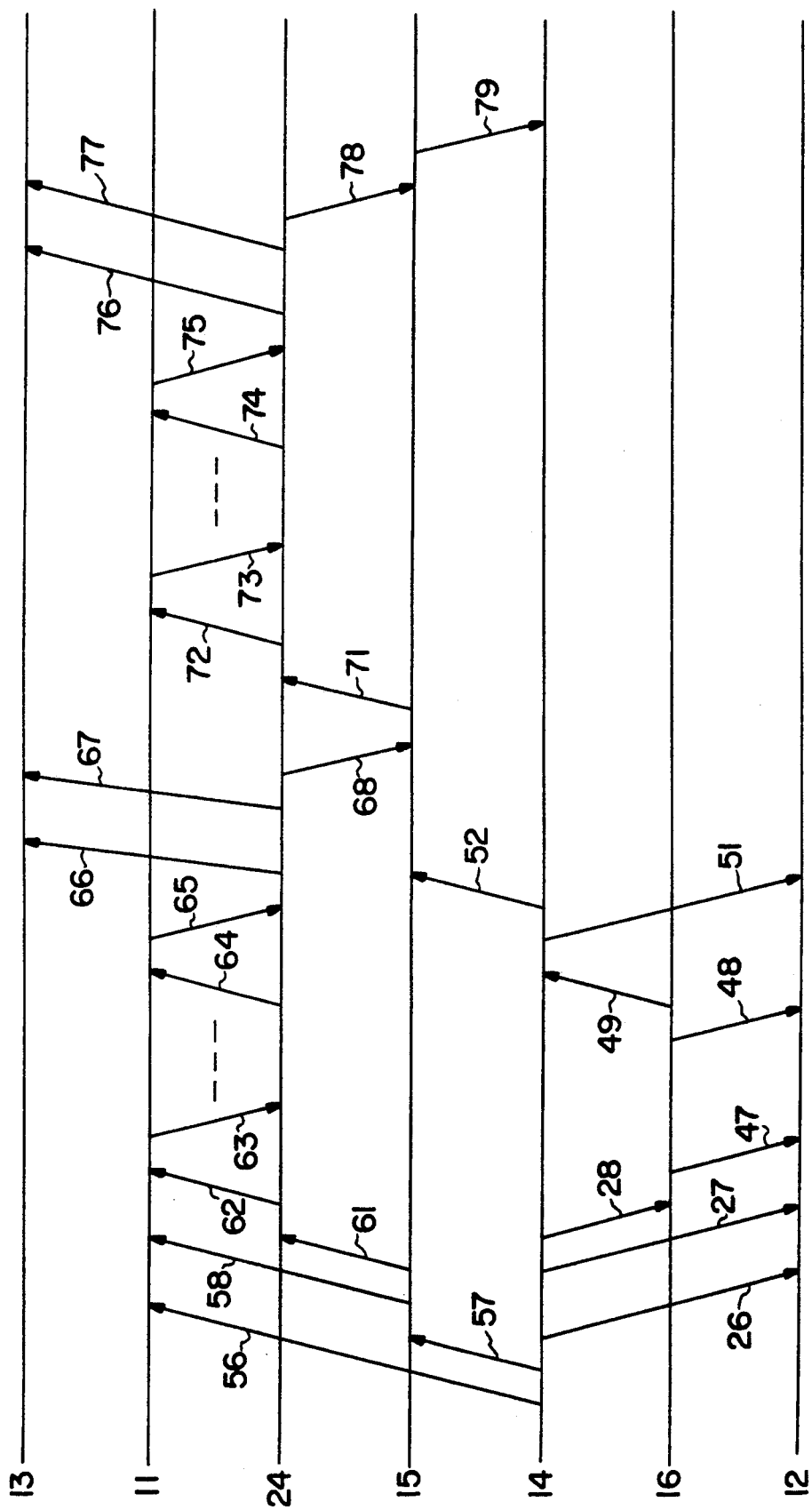
FIG. 4 is another schematic time chart for use in describing operation of the information processing system illustrated in FIG. 1.

Turning to FIG. 4, first through seventh horizontal lines show, from the top to the bottom of the figure, time axes of operation of the extended buffer memory 13, the first main memory 11, the extended buffer memory transfer controller 24, the input-output processor 15, the central processor 14, the arithmetic processor 16, and the second main memory 12. It should be noted that operation of the extended buffer memory transfer controller 24 is depicted.

In the manner described in connection with FIG. 2, the central processor 14 forms first through N-th channel programs 32 in the first main memory 11 and activates the input-output processor 15 as indicated by diagonal lines 56 and 57. It will be presumed that a write command is indicated in the first field A of each of the channel programs 32. In each channel program, the second field B is assumed to specify the extended buffer memory 13 as the destination and the first main memory 11 as the source. Having been activated, the input-output processor 15 reads the channel programs 32 from the first main memory 11 as indicated by a diagonal line 58.

In compliance with the first channel program 32(1), the input-output processor 15 activates the extended buffer memory transfer controller 24 in the manner indicated by a diagonal line 61. By activation of the extended buffer memory transfer controller 24, the top addresses of the source and the destination and the memory contents length are stored in the cache transfer controller 24 according to the third through the fifth fields C(1) to E(1).

The extended buffer memory transfer controller 24 sends the top address of the source to the first main memory 11 and reads a first portion of the selected memory contents from the first main memory 11 in the manner indicated by diagonal lines 62 and 63. The first portion is stored in the extended buffer memory transfer controller 24. In this manner, the extended buffer memory transfer controller 24 sends another top address of the source to the first main memory 11 and reads a final portion of the selected memory contents as indicated by diagonal lines 64 and 65. The final portion is stored in the extended buffer memory transfer controller 24.

The extended buffer memory transfer controller 24 sends a top address of the destination to the extended buffer memory 13 to write the selected memory content in the extended buffer memory 13 as indicated between diagonal lines 67 and 68. Having sent the selected memory contents towards the extended buffer memory 13, the extended buffer memory transfer controller 24 sends a first end report to the input-output processor 15 in the manner indicated by a diagonal line 68. The input-output processor 15 activates the extended buffer memory transfer controller 24 in accordance with a next following channel program.

It will be assumed again for brevity of the description that the next following channel program is the N-th channel program 32(N). The input-output processor 15 sends an N-th activation signal to the extended buffer memory transfer controller 24 as indicated by a diagonal line 71. The extended buffer memory transfer controller 24 sends a top address of the source to the first main memory 11 and reads a first portion of the selected memory contents as indicated by diagonal lines 72 and 73. The extended buffer memory transfer controller 24 finally sends an address of the source to the first main memory 11 and reads a final portion of the selected memory contents in the manner indicated by diagonal lines 74 and 75. The first through the final portions of the selected memory contents are stored in the extended buffer memory transfer controller 24.

The extended buffer memory transfer controller 24 sends a top address of the destination to the extended buffer memory 13 to store the selected memory contents in the extended buffer memory 13 as indicated between diagonal lines 76 and 77. Having sent the selected memory contents towards the extended buffer memory 13, the extended buffer memory transfer controller 24 sends a final end report to the input-output processor 15 as indicated by a diagonal line 78. In response, the input-output processor 15 sends a transfer end report to the central processor 14 in the manner indicated by a diagonal line 79. It is possible in this manner to use the input-output processor 15 on transferring the selected memory contents between the first main memory 11 and the extended buffer memory 13.

In the example depicted in FIG. 4, the arithmetic processor 16 continuously executes an arithmetic program after activation at the diagonal line 57. Execution of the arithmetic program proceeds as described in connection with FIG. 2. Similar diagonal lines are designated by like reference numerals.

Figure 5:
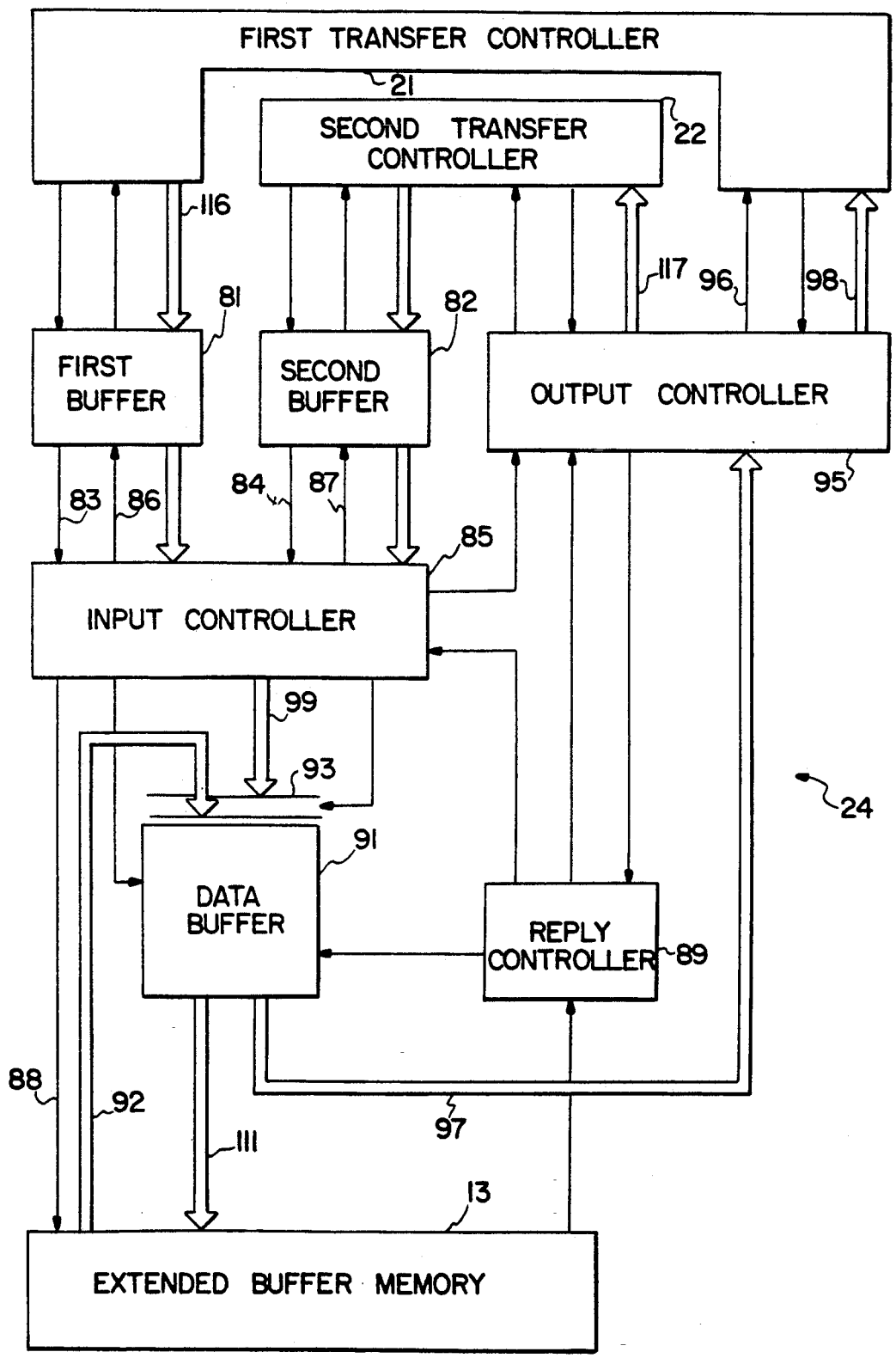
FIG. 5 shows, in blocks, an extended buffer memory and a part of the transfer controlling arrangement depicted in FIG. 1.

Referring now to FIG. 5, the extended buffer transfer controller 24 will be described in detail. It will be assumed that the input-output processor 15 reads a read command from the first main memory 11 together with an indication of the peripheral device 19 as the destination and the extended buffer memory 13 as the source, a destination top address, a source top address, and a memory contents length. The peripheral device 19, the extended buffer memory 13, the destination and the source top addresses, and the memory contents length will be called a first destination, a first source, a first destination top address, a first source top address, and a first memory content length. The memory contents will be called the first memory contents when indicated by the first source top address and the first memory contents length. The input-output processor 15 produces a first transfer request indicative of the first destination and source, the first destination and source top addresses, and the first memory content length.

It will furthermore be assumed that the arithmetic program is executed in the meantime and that the arithmetic processor 16 produces a write command together with indication of the extended buffer memory 13 as a second destination and the second main memory 12 as a second source, a second destination top address, a second source top address, and a second memory contents length. The second memory contents is specified by the second source top address and the second memory contents length. The arithmetic processor 16 issues a second transfer request indicative of the second destination and source, the second destination and source top addresses, and the second memory contents length. Each of the first and the second memory contents lengths may be one kilobyte long for each of the channel programs 32 illustrated with reference to FIG. 3.

Produced from the input-output processor 15, the first transfer request is sent to the first transfer controller 21. The second transfer request is delivered to the second transfer controller 22. In as much as the extended buffer memory 13 is indicated as one of the destination and the source, the transfer requests are fed to the extended buffer memory transfer controller 24 by the first and the second transfer controllers 21 and 22.

The extended buffer memory transfer controller 24 comprises first and second buffers 81 and 82 connected to the first and the second transfer controllers 21 and 22. The first transfer request is stored in the first buffer 81, which informs the capability of receiving the transfer request back to the input-output processor 15 through a first buffer output line 83 and through the first transfer controller 21. The second transfer request is stored in the second buffer 82, which informs the capability of receiving such a transfer request back to the arithmetic processor 16 through a second buffer output line 84 and through the second transfer controller 22. Each of the first and the second buffer output lines 83 and 84 is moreover used in informing the input-output and the arithmetic processors 15 and 16 of reception of a transfer request as a received transfer request.

When allowed in the manner which will shortly be described, the first buffer 81 delivers a first request signal to an input controller 85. When similarly allowed, the second buffer 82 sends a second request signal to the input controller 85. When produced in response to a received transfer request, such a request signal is processed in the input controller 85 in the manner which will become clear as the description proceeds. It should be understood that such a request signal represents the destination, the source, the destination top address, the source top address, and the memory contents length represented by the received transfer request. It will be assumed merely for clarity of the description that the first transfer request is received earlier than the second transfer request and that the first request signal is first dealt with in the input controller 85.

Being put in a busy state by processing the first request signal, the input controller 85 reports the busy state to the first and the second buffers 81 and 82 through first and second buffer input lines 86 and 87. Until the first request signal is wholly dealt with, the second transfer request is retained in the second buffer 82. If the input controller 85 is processing another request signal produced by one of the first and the second buffers 81 and 82 when the first transfer request reaches the first buffer 81, the first buffer 81 retains the first transfer request. The first buffer 81 therefore has a memory capacity for a first predetermined number of transfer requests, such as sixteen transfer requests. The second buffer 82 is given a memory capacity for a second predetermined number of transfer requests, such as sixteen transfer requests.

Dealing with the first request signal, the input controller 85 supplies the extended buffer memory 13 through input line 88 with a read request for the first memory contents. When the memory 13 can produce the first memory contents, the memory 13 delivers an extended buffer capability signal to a reply controller 89, which sends an activation signal to the input controller 85.

In response to the activation signal, the input controller 85 connects a data buffer 91 to an extended buffer memory output bus 92 through a selector 93, sends a write signal to the data buffer 91, and supplies the extended buffer memory 13 through the input line 88 with the first source top address and the first memory contents length. In response, the first memory contents is produced from the extended buffer memory 13 and stored in the data buffer 91 as a memorized contents. The extended buffer memory output bus 92 is preferably for sixty-four bytes. In this event, the first memory contents of one kilobyte is stored in the data buffer 91 in sixteen consecutive steps.

In the meantime, the input controller 85 sends a transfer request signal to an output controller 95. The transfer request signal represents the first destination and the first destination top address. Having produced the transfer request signal, the input controller 85 becomes capable of receiving the second request signal.

In response to the transfer request signal, the output controller 95 delivers a write request to the peripheral device 19 through a first controller output line 96, the first transfer controller 21, and the input-output processor 15. When the peripheral device 19 can receive the first memory contents, the input-output processor 15 sends an input allowance signal back to the output controller 95. In response, the output controller 95 causes the reply controller 89 to supply the data buffer 91 with a read signal indicative of the output controller 95 as an internal destination for the stored contents.

Through an internal bus 97, the stored contents are delivered from the data buffer 91 to the output controller 95 and thence to the peripheral device 19 through a first controller output bus 98, the first transfer controller 21, and the input-output processor 15. In this manner, the first memory contents are read from the extended buffer memory 13 into the peripheral device 19. When the first controller output bus 98 is for sixteen bytes, the first memory contents of one kilobyte is stored in the peripheral device 19 in 126 consecutive steps.

Having produced the transfer request signal, the input controller 85 receives the second request signal from the second buffer 82. Dealing with the second request signal, the input controller 85 delivers a read request to the second main memory 12 through the second buffer input and output lines 87 and 84 and the second transfer controller 22. When the second main memory 12 can produce the second memory contents, the input controller 85 connects a buffer input bus 99 to the data buffer 91 through the selector 93, sends a write signal to the data buffer 91, and delivers the second source top address and the second memory contents length to the second main memory 12 through the second buffer input and output lines 87 and 84. The second memory contents are produced from the second main memory 12 and stored in the data buffer 91 afresh as memorized contents.

In the meantime, the input controller 85 delivers a write request to the extended buffer memory 13 through the extended buffer memory input line 88. When the extended buffer memory 13 can receive the second memory contents, the extended buffer memory 13 sends another extended buffer memory capability signal to the reply controller 89, which sends another activation signal to the input controller 85.

In response to this activation signal, the input controller 85 sends the second destination top address to the extended buffer memory 13 through the extended buffer memory input line 88. In timed relation to the last-mentioned activation signal, the reply controller 89 supplies the data buffer 91 with a read signal indicative of the extended buffer memory 13 as a destination of the memorized contents. Through an extended buffer input bus 111, the memorized contents are written in the extended buffer memory 13. Having produced the second destination top address, the input controller 85 becomes able to receive another request signal from one of the first and the second buffers 81 and 82. In this manner, the second memory contents is transferred from the second main memory 12 to the extended buffer memory 13 and is written in the extended buffer memory 13.

In FIG. 5, the extended buffer transfer controller 24 can deal with a transfer request produced by the central processor 14 for transfer of a selected one of the control contents of the first main memory 11 to the extended buffer memory 13 as a selected one of the arithmetic contents. In this event, the stored contents are stored in the data buffer 91 through the first transfer controller 21 and through a first controller input bus 116. In other respects, operation is similar to that described in conjunction with the second request signal.

The extended buffer transfer controller 24 can deal with a transfer request produced by the arithmetic processor 16 for transfer of a selected one of the arithmetic contents of the extended buffer memory 13 to the second main memory 12. In this case, the output controller 95 sends the stored contents to the second main memory 12 through a second controller output bus 117 and the second transfer controller 22. In other respects, operation is similar to that described in connection with the first request signal.

It should be now understood that the extended buffer memory transfer controller 24 can process a transfer request produced by the control processor 14 for transfer of selected contents of the arithmetic contents of the extended buffer memory 13 to the first main memory 11 as a selected one of the control contents. The extended buffer memory transfer controller 24 can process another transfer request produced by the input-output processor 15 for transfer of a selected one of the control contents of the peripheral device 19 through the input-output processor 15 and the first transfer controller 21 to the extended buffer memory 13 as a selected one of the arithmetic contents.

The transfer requests will now be numbered first through sixth transfer requests in the manner described in conjunction with FIG. 1. It can be understand that the input controller 85 produces a first and a second transfer request signal when one of the first, the third, and the fifth transfer requests is received as the received transfer request and when one of the second, the fourth, and the sixth transfer requests is received as the received transfer request, respectively. The first transfer request signal comprises a selection signal for making the selector 93 select the buffer input bus 99 and the write request delivered to the extended buffer memory 13 through the extended buffer input line 88. The second transfer request signal comprises a selection signal for making the selector 93 select the extended buffer output bus 92, the read request delivered through the extended buffer input line 88, and the transfer request signal sent to the output controller 95.

The transfer controlling arrangement comprises a first buffer means comprising the first transfer controller 21 and the first buffer 81. The first buffer means is for buffering the first through the fourth transfer requests up to the first predetermined number. A second buffer means comprises the second transfer controller 22 and the second buffer 82 to buffer the fifth and the sixth transfer requests up to a second predetermined number.

In the transfer controlling arrangement, an input controller means comprises the input controller 85 and the selector 93. It is to be noted that the selector 91 is connected to the extended buffer memory 13 through the extended buffer output bus 92 and to the first and the second buffer means through the buffer input bus 99. It can be understood that the buffer input bus 99 is connected to the first main memory 11 through the first transfer controller 21, to the second main memory 12 through the second transfer controller 22, and to the peripheral device 19 through the first transfer controller 21 and the input-output processor 15. The input controller means receives one of the first through the sixth transfer requests at a time as the received transfer request and stores a selected one of the control contents of the first main memory 11 and the peripheral device 19 and a selected one of the arithmetic contents of the second main memory 12 and the extended buffer memory 13 in the data buffer 91 as the stored contents when the received transfer request is one of the first, the third, and the fifth transfer requests and is one of the second, the fourth, and the sixth transfer request, respectively.

In the transfer controlling arrangement, an output controller means comprises the reply controller 89 and the output controller 95. The output controller means transfers the stored contents to the extended buffer memory 13 through the extended buffer input bus 111, to the first main memory 11 through the first transfer controller 21, to the peripheral device 19 through the first transfer controller 21 and the input-output processor 15, and to the second main memory 12 through the second transfer controller 22 when the received transfer request is one of the first, the third, and the fifth transfer requests, is the second transfer request, is the fourth transfer request, and is the sixth transfer request, respectively.

The input controller means comprises the input controller 85 which produces the first and the second transfer request signals. In the input controller means, a first input means comprises the selector 93 and the buffer input bus 99. Supplied with the first transfer request signal, the first input means stores the selected one of the control and the arithmetic contents of the first and the second main memories 11 and 12 and of the peripheral device 19 in the data buffer 91. A second input means comprises the selector 93 and the extended buffer output bus 92. In response to the second transfer request signal, the second input means stores the selected one of the arithmetic contents of the extended buffer memory 13 in the data buffer 91.

In the output controlling means, a first output means comprises the reply controller 89 and the extended buffer input bus 111. The first transfer request signal makes the extended buffer memory 13 produce the extended buffer capability signal which, in turn, makes the reply controller 89 produce the read signal indicative of the extended buffer memory 13 as the destination. The first output means is therefore supplied with the first transfer request signal to transfer the stored contents to the extended buffer memory 13. A second output means comprises the reply controller 89, the internal bus 97, and the output controller 95. Through the extended buffer memory 13, the second transfer request signal causes the reply controller 89 to produce the read signal indicative of the output controller 95 as the internal destination. The second output means is therefore supplied with the second transfer request signal to transfer the stored contents to the first and the second main memories 11 and 12 and to the peripheral device 19.

Reviewing FIGS. 4 and 5, a transfer request may be produced by the input-output processor 15 for transfer of a selected one of the control contents of the first main memory 11 to the extended buffer memory 13 as a selected one of the arithmetic contents. Similarly, the input-output processor 15 may produce a transfer request for transfer of a selected one of the arithmetic contents of the extended buffer memory 13 to the first main memory 11 as a selected one of the control contents and another transfer request for transfer of a selected one of the arithmetic contents between the second main memory 12 and the extended buffer memory 13. The central processor 14 may produce a transfer request for transfer of a selected one of the arithmetic contents between the second main memory 12 and the extended buffer memory 13. The transfer controlling arrangement can process all such transfer requests.

While this invention has thus far been described in specific conjunction with a single preferred embodiment thereof, it will now be readily possible for one skilled in the art to put this invention into effect in various other ways. For example, the read request may specify the source top address and the memory content length. The write request may indicate the destination top address. Each of the first and the second buffers 81 and 82 may include a buffer for temporarily storing the selected memory contents for each transfer request retained therein. In addition, the input-output processor 15 may include a similar buffer either for each of a read and a write command or for both. The request signal need not represent the destination, the source, the destination and the source top addresses, and the memory contents length. Instead, each of the first and the second transfer request signals may be made to represent such data with the input buffer 85 made to deliver a read signal, through the first buffer input line 86 or the second buffer input line 87, to one of the first and the second buffers 81 and 82 that has produced the request signal. The fifth field E of each of the channel programs 32 may represent a memory contents length of longer than one kilobyte. In this instance, the data buffer 91 should have a memory capacity of more than one kilobyte.

What is claimed is:

1. An information processing system for storing and processing control contents, including control programs and control data, and arithmetic contents, including arithmetic programs and arithmetic data, said system comprising:
   a first processing system comprising
      a first main memory for storing a given portion of said control contents,
      a peripheral storage device for storing an additional portion of said control contents,
      an input-output processor coupled to said peripheral storage device,
      a central processor for executing said control programs,
      a first transfer controller for coupling said first main memory to said central processor and to said input-output processor and for controlling transfer of said control contents between said first main memory and said central processor and between said main memory and said peripheral storage device through said input-output processor;
   a second processing system comprising
      a second main memory for storing said arithmetic contents,
      an arithmetic processor for executing said arithmetic programs,
      a second transfer controller for coupling second main memory to said arithmetic processor and for controlling transfer to said arithmetic contents between said second main memory and said arithmetic processor;
   said first processing system and said second processing system operating in parallel, independently of each other;
   an extended buffer memory;
   an extended buffer memory transfer controller coupled to said extended buffer memory and to said first transfer controller and said second second transfer controller for controlling transfer of selected contents of said control contents between said peripheral storage device and said extended buffer memory through said input-output processor, said first transfer controller and said extended buffer memory transfer controller;
   said extended buffer memory transfer controller accessing said first main memory with a top source address to read a first portion of a selected content of said control contents from said first main memory for storage in said extended buffer memory transfer controller and subsequently accessing said first main memory with another top source address to read a final portion of said selected content of said control contents from said first main memory for storage in said extended buffer memory transfer controller, said extended buffer memory transfer controller also writing said selected content in said extended buffer memory at a top destination address; and
   a transfer controlling arrangement comprising said first transfer controller, said second transfer controller and said extended buffer memory transfer controller;
   said second mein memory, said extended buffer memory and said peripheral storage device respectively storing selected ones of user programs and data;
   said input-output processor coupling said peripheral storage device to said transfer controlling arrangement and producing a first transfer request for transfer of a first selected one of said user programs and data between said peripheral storage device and said extended buffer memory;
   said arithmetic processor producing a second transfer request for transfer of a second selected one of said user programs and data between said second main memory and said extended buffer memory;
   said transfer controlling arrangement receiving and controlling said first and second transfer request so as to effect said first and second transfer requests.

2. An information processing system for storing and processing control contents, including control programs and control data, and arithmetic contents, including arithmetic programs and arithmetic data, said system comprising:
   a first processing system comprising
      a first main memory for storing a given portion of said control contents,
      a peripheral storage device for storing an additional portion of said control contents,
      an input-output processor coupled to said peripheral storage device,
      a central processor for executing said control programs,
      a first transfer controller for coupling said first main memory to said central processor and to said input-output processor and for controlling transfer of said control contents between said first main memory and said central processor and between said main memory and said peripheral storage device through said input-output processor;
   a second processing system comprising
      a second main memory for storing said arithmetic contents,
      an arithmetic processor for executing said arithmetic programs,
      a second transfer controller for coupling said second main memory to said arithmetic processor and for controlling transfer of said arithmetic contents between said second main memory and said arithmetic processor;
   said first processing system and said second processing system operating in parallel, independently of each other;
   an extended buffer memory;
   an extended buffer memory transfer controller coupled to said extended buffer memory and to said first transfer controller and said second transfer controller for controlling transfer of selected contents of said control contents between said peripheral storage device and said extended buffer memory through said input-output processor, said first transfer controller and said extended buffer memory transfer controller;

said extended buffer memory transfer controller accessing said first main memory with a top source address to read a first portion of a selected content of said control contents from said first main memory for storage in said extended buffer memory transfer controller and subsequently accessing said first main memory with another top source address to read a final portion of said selected content of said control contents from said first main memory for storage in said extended buffer memory transfer controller, said extended buffer memory transfer controller also writing said selected content in said extended buffer memory at a top destination address; and a transfer controlling arrangement comprising said first transfer controller, said second transfer controller and said extended buffer memory transfer controller;

said central processor producing
- a first transfer request for transfer of a first selected one of said control programs and said control data from said first main memory to said extended buffer memory as a first selected one of said arithmetic programs and said arithmetic data and
- a second transfer request for transfer of a second one of said arithmetic programs and said arithmetic data from said extended buffer memory to said first main memory as a second selected one of said control programs and said control data;

said arithmetic processor producing a third transfer request for transfer of a third selected one of said arithmetic programs and said arithmetic data between said second main memory and said extended buffer memory;

said transfer controlling arrangement receiving and controlling said first, second and third transfer requests so as to effect said first, second and third transfer requests.

3. An information processing system for storing and processing control contents, including control programs and control data, and arithmetic contents, including arithmetic programs and arithmetic data, said system comprising:
- a first processing system comprising
  - a first main memory for storing a given portion of said control contents,
  - a peripheral storage device for storing an additional portion of said control contents,
  - an input-output processor coupled to said peripheral storage device,
  - a central processor for executing said control programs,
  - a first transfer controller for coupling said first main memory to said central processor and to said inputoutput processor and for controlling transfer of said control contents between said first main memory and said central processor and between said main memory and said peripheral storage device through said input-output processor;
- a second processing system comprising
  - a second main memory for storing said arithmetic contents,
  - an arithmetic processor for executing said arithmetic programs,
  - a second transfer controller for coupling said second main memory to said arithmetic processor and for controlling transfer of said arithmetic contents between said second main memory and said arithmetic processor;

said first processing system and said second processing system operating in parallel, independently of each other;

an extended buffer memory;

an extended buffer memory transfer controller coupled to said extended buffer memory and to said first transfer controller and said second transfer controller for controlling transfer of selected contents of said control contents between said peripheral storage device and said extended buffer memory through said input-output processor, said first transfer controller and said extended buffer memory transfer controller;

said extended buffer memory transfer controller accessing said first main memory with a top source address to read a first portion of a selected content of said control contents from said first main memory for storage in said extended buffer memory transfer controller and subsequently accessing said first main memory with another top source address to read a final portion of said selected content of said control contents from said first main memory for storage in said extended buffer memory transfer controller, said extended buffer memory transfer controller also writing said selected content in said extended buffer memory at a top destination address;

a transfer controlling arrangement comprising said first transfer controller, said second transfer controller and said extended buffer memory transfer controller; and said central processor producing
- a first transfer request for transfer of a first selected one of said control contents of said first main memory to said extended buffer memory as a first selected one of said arithmetic contents, and
- a second transfer request for transfer of a second selected one of said arithmetic contents of said extended buffer memory to said first main memory as a second selected one of said control contents;

said input-output processor producing
- a third transfer request for transfer of a third selected one of said control contents of said peripheral storage device to said extended buffer memory as a third selected one of said arithmetic contents, and
- a fourth transfer request for transfer of a fourth selected one of said arithmetic contents of said extended buffer memory to said peripheral storage device as a fourth selected one of said control contents;

said arithmetic processor producing
- a fifth transfer request for transfer of a fifth selected one of said arithmetic contents from said second main memory to said extended buffer memory, and a sixth transfer request for transfer of a sixth one of said arithmetic contents from said extended buffer memory to said second main memory;

said input-output processor further producing a seventh transfer request for transfer of a seventh selected one of said control contents between said first main memory and said peripheral storage device;

said transfer controlling arrangement receiving and controlling said first through seventh transfer requests to effect said first through seventh transfer requests.

4. An information processing system as claimed in claim 3, wherein said transfer controlling arrangement comprises:
   a) a data buffer for storing a selected one of said control contents and said arithmetic contents for each of said first through said sixth transfer requests as memorized contents;
   b) first buffer means connected to said central and said input-output processors for buffering said first through fourth transfer requests up to a first predetermined number;
   c) second buffer means connected to said arithmetic processor for buffering said fifth and said sixth transfer requests up to a second predetermined number;
   d) input controller means connected to said first and said second main memories, to said peripheral storage device through said input-output processor, to said extended buffer memory, to said first and second buffer means, and to said data buffer for receiving one of said first through said sixth transfer requests from said first and said second buffer means at a time as a received transfer request, for storing a selected one of said control contents of said first main memory and of said peripheral storage device in said data buffer when said received transfer request is one of said first and said third transfer requests, for storing a selected one of said arithmetic contents of said second main memory in said data buffer when said received transfer request is said fifth transfer request, and for storing a selected one of said arithmetic contents of said extended buffer memory in said data buffer when said received transfer request is one of said second, said fourth, and said sixth transfer requests; and
   e) output controller means connected to said first and said second main memories, to said peripheral storage device through said input-output processor, to said extended buffer memory, to said data buffer, and to said input controller means for transferring said memorized contents to said extended buffer memory when said received transfer request is one of said first, said third, and said fifth transfer requests, for transferring said memorized contents to said first main memory when said received transfer request is said second transfer request, to said peripheral storage device through said input-output processor when said received transfer request is said fourth transfer request, and for transferring said memorized contents to said second main memory when said received transfer request is said sixth transfer request.

5. An information processing system as claimed in claim 4, wherein
   a) said input controller means comprises:
      1) an input controller connected to said first and said second buffer means for receiving one of said first through said sixth transfer requests at a time as said received transfer request to produce a first transfer request signal and a second transfer request signal when said received transfer request is one of said first, said third and said fifth transfer requests and is one of said second, said fourth, and said sixth transfer requests, respectively;
      2) first input means connected to said first and said second main memories, to said peripheral device through said input-output processor, to said input controller, and to said data buffer for storing a selected one of said control contents of said first main memory and of said peripheral device in said data buffer and a selected one of said arithmetic contents of said second main memory in said data buffer as said memorized contents in response to said first transfer request signal; and
      3) second input means connected to said extended buffer memory, said input controller, and said data buffer for storing a selected one of said arithmetic contents of said extended buffer memory in said data buffer as said memorized contents in response to said second transfer request signal; and
   b) said output controller means comprises
      1) first output means connected to said extended buffer memory, said input controller, and said data buffer for transferring said memorized contents to said extended buffer memory in response to said first transfer request; and
      2) second output means connected to said first and said second main memories, to said peripheral storage device through said input-output processor, to said extended buffer memory, to said input controller, and said data buffer for transferring said memorized contents to said first main memory and to said peripheral storage device in response to said second transfer request signal.

* * * * *